United States Patent [19]

Zanka et al.

[11] Patent Number: 5,191,061

[45] Date of Patent: Mar. 2, 1993

[54] RESIN FOR HIGH-REFRACTION LENS CONTAINING A SULFUR-CONTAINING AROMATIC(METH)ACRYLATE AND A MERCAPTO COMPOUND

[75] Inventors: Yukihito Zanka; Seiichiro Hayakawa; Tsutomu Isaka; Fumie Watari, all of Ibaraki, Japan

[73] Assignee: Misubishi Petrochemical Co., Ltd., Tokyo, Japan

[21] Appl. No.: 779,051

[22] Filed: Oct. 18, 1991

[30] Foreign Application Priority Data

Oct. 24, 1990 [JP] Japan .................................. 2-284466
Oct. 24, 1990 [JP] Japan .................................. 2-284467

[51] Int. Cl.$^5$ ..................... C08G 75/00; C08F 228/00
[52] U.S. Cl. .................. 528/376; 525/328.5; 525/350; 526/289; 351/159
[58] Field of Search ................ 526/286, 289; 528/376; 525/328.5, 350

[56] References Cited

FOREIGN PATENT DOCUMENTS 26010 2/1985 Japan .
72748 4/1986 Japan .

OTHER PUBLICATIONS

WO90/04587, May 3, 1990 (abstract).
Chemical Abstracts, vol. 107, No. 22, p. 19, Nov. 1987, & JP-A-62 10 102, Nobuo Hisada, et al., "Reactive Emulsifying Agents".
Chemical Abstracts, vol. 108, No. 8, p. 60, Feb. 1988, & JP-A-62 195357, Mitsutoshi Aritomi, et al., "Sulfur-Containing(Meth)Acrylates for Transparent Polymers with High Refractive Index".

*Primary Examiner*—Christopher Henderson
*Attorney, Agent, or Firm*—Oblon, Spivak, McClelland, Maier & Neustadt

[57] ABSTRACT

A cured resin for high-fraction lenses is disclosed, which is obtained by polymerizing a composition comprising (A) from 70 to 99 parts by weight of a sulfur-containing aromatic (meth)acrylate represented by formula (I):

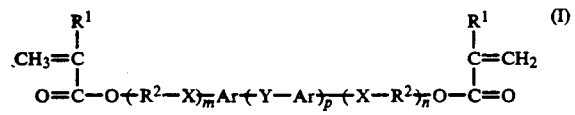

wherein $R^1$ represents a hydrogen atom or a methyl group; $R^2$ represents an alkylene group; Ar represents an arylene group, an arylene group substituted with a halogen atom except a fluorine atom, an aralkylene group, or an aralkylene group substituted with a halogen atom except a fluorine atom; X represents —O— or —S—; Y represents —S— or —SO$_2$— when X is —O—, or Y represents —S—, —SO$_2$—, —CO—, an alkylene group, an aralkylene group, an alkylene ether group, an aralkylene ether group, an alkylene thioether group, or an aralkylene thioether group when X is —S—; m and n each represents an integer of from 1 to 5; and p represents 0 or an integer of from 1 to 10, (B) from 1 to 30 parts by weight of at least one mercapto compound selected from (B-1) a compound represented by formula (II):

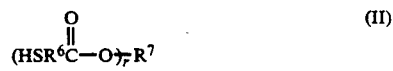

wherein $R^6$ represents a methylene group or an ethylene group; $R^7$ represents a hydrocarbon group having from 2 to 15 carbon atoms or an alkyl ether residue having from 2 to 15 carbon atoms; and r represents an integer of from 2 to 6, (B-2) a compound represented by formula (III):

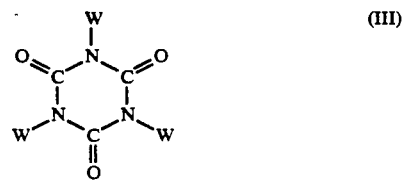

wherein W represents

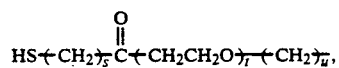

wherein s and u each represents an integer of from 1 to 8, and t represents 0 or an integer of 1 or 2, and (B-3) a compound represented by formula (IV):

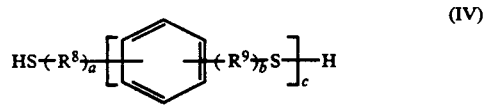

wherein $R^8$ and $R^9$ each represents an alkylene group having from 1 to 3 carbon atoms; a and b each represents 0 or 1; and c represents 1 or 2, and (C) up to 50 parts by weight of an ethylenically unsaturated monomer copolymerizable with the compound represened by formula (I). The resin has a high refractive index, high transparency, and excellent impact resistance.

9 Claims, No Drawings

RESIN FOR HIGH-REFRACTION LENS CONTAINING A SULFUR-CONTAINING AROMATIC(METH)ACRYLATE AND A MERCAPTO COMPOUND

FIELD OF THE INVENTION

This invention relates to a resin for plastic lenses and, more particularly to a resin for lenses having high refractive index and excellent impact resistance.

BACKGROUND OF THE INVENTION

Diethylene glycol bis(allyl carbonate) has hitherto been used widely as a resin for plastic lenses. While this resin is advantageous because of its excellent impact resistance and transparency and satisfactory light scattering characteristics, it has a low refractive index of 1.50, requiring some thickness for obtaining refraction equal to that of glass.

It is known, on the other hand, that various diacrylates or dimethacrylates are easily radical-polymerized to provide lenses having high transparency. For example, resins obtained from di(meth)acrylates having a bromine-containing bisphenol A skeleton (refer to JP-A-59-184210, the term "JP-A" as used herein means an "unexamined published Japanese patent application") and JP-A-59-193915), di(meth)acrylates having a sulfur-containing aromatic skeleton (refer to JP-A-60-26010 and JP-A-62-195357), etc. are known to exhibit such excellent optical characteristics as having a high refractive index and a high Abbe's number at balance.

In general, cured resins comprising a highly cross-linked structure obtained by polymerization of di(meth)acrylate compounds are excellent in heat resistance, abrasion resistance, and transparency, but, in turn, tend to have brittleness. In order to overcome brittleness, use of urethane (meth)acrylated bromine-containing bisphenol A derivatives have been proposed as disclosed in JP-A-60-51706. However, these resins have not only an increased specific viscosity due to the bromine atom and also deteriorated weather resistance.

JP-A-2-141702 discloses resins having improved impact resistance which are obtained by copolymerizing bis(meth)acryloxymethyl-tricyclodecane and a polyfunctional thiol, e.g., pentaerythritol tetrakis($\beta$-thiopropionate). Though having a high Abbé's number, these resins have a relatively low refractive index of 1.55 or less. Further, JP-A-63-309509 proposes to use a polymerizable monomer obtained by reacting a thiol and divinylbenzene. In this case, however, the radical terminal should be treated with pyrogallol.

SUMMARY OF THE INVENTION

An object of the present invention is to provide an improved resin suitable for use as a lens, which is light, has a high refractive index, and is excellent in transparency and impact resistance.

The present invention relates to a cured resin for high-refraction lenses which is obtained by polymerizing a composition comprising (A) from 70 to 99 parts by weight of a sulfur-containing aromatic (meth)acrylate represented by formula (I):

wherein $R^1$ represents a hydrogen atom or a methyl group; $R^2$ represents an alkylene group having from 1 to 6 carbon atoms; Ar represents an arylene group having from 6 to 30 carbon atoms, an arylene group having from 6 to 30 carbon atoms substituted with a halogen atom except a fluorine atom, an aralkylene group having from 6 to 30 carbon atoms, or an aralkylene group having from 6 to 30 carbon atoms substituted with a halogen atom except a fluorine atom; X represents —O— or —S—; Y represents —S— or —SO$_2$— when X is —O—, or Y represents —S—, —SO$_2$—, —CO—, an alkylene group having from 1 to 12 carbon atoms, an aralkylene group having up to 12 carbon atoms, an alkylene ether group having up to 12 carbon atoms, an aralkylene ether group having up to 12 carbon atoms, an alkylene thioether group having up to 12 carbon atoms, or an aralkylene thioether group having up to 12 carbon atoms when X is —S—; m and n each represents an integer of from 1 to 5; and p represents 0 or an integer of from 1 to 10, (B) from 1 to 30 parts by weight of at least one mercapto compound selected from (B-1) a compound represented by formula (II):

wherein $R^6$ represents a methylene group or an ethylene group; $R^7$ represents a hydrocarbon group having from 2 to 15 carbon atoms or an alkyl ether residue having from 2 to 15 carbon atoms; and r represents an integer of from 2 to 6, (B-2) a compound represented by formula (III):

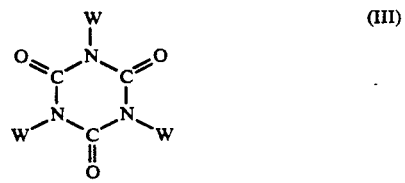

wherein W represents

wherein s and u each represents an integer of from 1 to 8, and t represents 0 or an integer of 1 or 2, and (B-3) a compound represented by formula (IV):

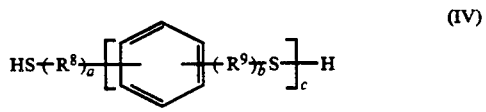

wherein $R^8$ and $R^9$ each represents an alkylene group having from 1 to 3 carbon atoms; a and b each represents 0 or 1; and c represents 1 or 2, and (C) up to 50 parts by weight of an ethylenically unsaturated monomer copolymerizable with the compound represented by formula (I).

DETAILED DESCRIPTION OF THE INVENTION

The sulfur-containing aromatic (meth)acrylate represented by formula (I) (hereinafter referred to as monomer (A)) has such a structure in which (meth)acryloyl groups are linked via a sulfur-containing chain. These compounds may be used either individually or in combination of two or more thereof.

The terminology "(meth)acrylate" as used herein means acrylate and methacrylate inclusively, and the terminology "(meth)acryloyl group" as used herein means acryloyl group and methacryloyl group inclusively.

Specific examples of monomer (A) are p-bis(β-acryloyloxyethylthio)xylylene, p-bis(β-methacryloyloxyethylthio)xylylene, m-bis(β-acryloyloxyethylthio)xylylene, m-bis(β-methacryloyloxyethylthio)xylylene, α,α'-bis(β-acryloyloxyethylthio)-2,3,5,6-tetrachloro-p-xylylene, α,α'-bis(β-methacryloyloxyethylthio)-2,3,5,6-tetrachloro-p-xylylene, 4,4'-bis(β-acryloyloxyethoxy)diphenyl sulfide, 4,4'-bis(β-methacryloyloxyethoxy)diphenyl sulfide, 4,4'-bis(β-acryloyloxyethoxyethoxy)diphenylsulfone, 4,4'-bis(β-methacryloyloxyethoxyethoxy)diphenylsulfone, 4,4'-bis(β-acryloyloxyethylthio)diphenyl sulfide, 4,4'-bis(β-methacryloyloxyethylthio)diphenyl sulfide, 4,4'-bis(β-acryloyloxyethylthio)diphenylsulfone, 4,4'-bis(β-methacryloyloxydiethylthio)diphenylsulfone, 4,4'-bis(β-methacryloyloxyethylthio)diphenyl ketone, β,β'-bis(p-acryloyloxyphenylthio)diethyl ether, β,β'-bis(p-methacryloyloxyphenylthio)diethyl ether, β,β'-bis(p-methacryloyloxyphenylthio)diethyl ether, β,β'-bis(p-methacryloyloxyphenylthio)diethyl ether; and compounds represented by formula (I) wherein X is —S—, and —Ar—(Y—Ar—)$_p$ is an oligomer represented by formula:

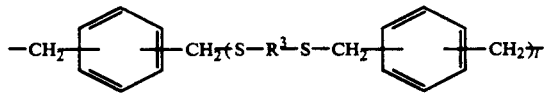

wherein $R^3$ represents an alkylene group having from 1 to 12 carbon atoms, and preferably from 1 to 6 carbon atoms, which may contain an ether linkage in its chain; and l represents an average degree of oligomerization ranging from 1 to 5, or an oligomer represented by formula:

wherein l represents an average degree of oligomerization ranging from 1 to 5.

Of monomers (A) of formula (I), those represented by formula (I'):

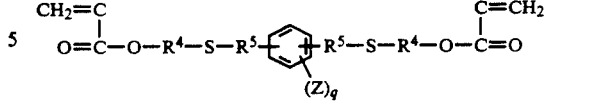

wherein $R^1$ is as defined above; $R^4$ and $R^5$ each represents a divalent hydrocarbon group having from 1 to 4 carbon atoms; Z represents a halogen atom exclusive of a fluorine atom; and q represents 0 or an integer of from 1 to 4, are particularly preferred from the standpoint of optical properties, such as refractive index, of the polymer obtained and handling properties, such as viscosity, of the monomer per se.

Specific examples of the monomers of formula (I') are p-bis[β-(meth)acryloyloxyisopropylthio]xylylene, m-bis[β-(meth)acryloyloxyethylthio] ethylphenylene, and p-bis[β-(meth)acryloyloxybutylthio]tetrachloroxylylene, with p-bis[β-(meth)acryloyloxyethylthio]xylylene and m-bis[β-(meth)acryloyloxyethylthio]xylylene being more preferred.

The compound represented by formula (II) (hereinafter referred to as monomer (B-1)) is a bi- to hexafunctional thioglycolic acid or thiopropionic acid ester. Monomers (B-1) may be used either individually or in combination of two or more thereof.

Specific examples of monomer (B-1) are pentaerythritol tetrakis(β-thiopropionate), pentaerythritol tetrakis(thioglycolate), trimethylolpropane tris(β-thiopropionate), trimethylolpropane tris(thioglycolate), diethylene glycol bis(β-thiopropionate), diethylene glycol bis(thioglycolate), triethylene glycol bis(β-thipropionate), triethylene glycol bis(thioglycolate), dipentaerythritol hexakis(β-thiopropionate), and dipentaerythritol hexakis(thioglycolate).

Specific examples of the compound represented by formula (III) (hereinafter referred to as monomer (B-2)) are tris[2-(β-thiopropionyloxy)ethyl] triisocyanurate, tris(2-thioglyconyloxyethyl) isocyanurate, tris[2-(β-thiopropionyloxyethoxy)ethyl] triisocyanurate, tris(2-thioglyconyloxyethoxyethyl) triisocyanurate, tris[3-(β-thiopropionyloxy)propyl] triisocyanurate, and tris(3-thioglyconyloxypropyl) triisocyanurate.

Specific examples of the compound represented by formula (IV) (hereinafter referred to as monomer (B-3)) are benzene dimercaptan, xylylene dimercaptan, and 4,4'-dimercaptodiphenyl sulfide.

Specific examples of the ethylenically unsaturated monomer copolymerizable with monomer (A) (hereinafter referred to as monomer (C)) include styrene monomers, e.g., styrene, chlorostyrene, dibromostyrene, and α-methylstyrene; monofunctional (meth)acrylic esters, e.g., phenyl (meth)acrylate, phenoxy (meth)acrylate, and pentabromophenyl (meth)acrylate; bifunctional (meth)acrylic esters, e.g., ethylene glycol di(meth)acrylate, and 2,2-bis[4(β-methacryloyloxyethoxy)phenyl]propane with its nucleus substituted or unsubstituted with a halogen; and trifunctional (meth)acrylic esters, e.g., trimethylolpropane tri(meth)acrylate. Preferred of these monomers (C) are styrene, chlorostyrene, bromostyrene, 2,2-bis[4(β-methacryloyloxyethoxy)phenyl]propane, and 2,2-bis[4(β-methacryloyloxyethoxy)-3,5-dibromophenyl]propane, and mixtures thereof.

Although monomers (A) are homopolymerizable, cured resins obtained from monomer (A) alone are inferior in impact resistance. In the present invention, monomer (A) is copolymerized with a mercapto compound selected from monomers (B-1), (B-2), and (B-3) and, if desired, other copolymerizable monomers (monomer (C)) to provide a cured resin free from coloring and having improved surface precision and markedly improved impact resistance.

Monomer (A) and monomer (B) are used in an amount of from 70 to 99 parts by weight and from 1 to 30 parts by weight, respectively, and preferably from 80 to 98 parts by weight and from 2 to 20 parts by weight, respectively. In general, if the proportion of monomer (B) is too small, sufficient effects of improving impact resistance are hardly obtained. If it is too large, the resulting cured resin would have reduced heat resistance.

Monomer (C) is used in a proportion of not more than 50 parts by weight, and preferably not more than 30 parts by weight. If the proportion of monofunctional monomer (C) is excessive, the resulting cured resin would have reduced heat resistance. If the proportion of polyfunctional monomer (C) is excessive, the resulting cured resin would have reduced impact resistance.

Curing of the resin composition comprising monomers (A) and (B) and, if desired, monomer (C) can be performed by known radical polymerization techniques using an initiator capable of generating a radical on heating or irradiation. In order to increase productivity of curing, ultraviolet curing or a combination of ultraviolet curing and thermal polymerization is recommended. For example, a photopolymerization initiator and thermal polymerization initiator are added to the resin composition, and the curable composition is injected into a mold and cured by ultraviolet irradiation to a degree sufficient for removing from the mold. The thus cured resin is removed from the mold and put in an oven where thermal polymerization is conducted.

Suitable photopolymerization initiators include benzophenone, benzoin methyl ether, benzoin isopropyl ether, diethylthioxanthone, diethoxyacetophenone, 1-hydroxycyclohexyl phenyl ketone, and 2,4,6-trimethylbenzoyldiphenylphosphine oxide.

Suitable thermal polymerization initiators include benzoyl peroxide, diisopropyl peroxycarbonate, lauroyl peroxide, t-butyl peroxy(2-ethylhexanoate), and 2,2'-azoisobutyronitrile.

The photopolymerization initiator and thermal polymerization initiator are used in an amount of from 0.01 to 5% by weight, and preferably from 0.03 to 2% by weight, based on the total weight of the resin composition. If the amount is too small, curing is insufficient. If it is too large, the cured resin tends to be yellowed, and polymerization control is difficult.

If desired, additives such as antioxidants and ultraviolet absorbents, may be added to the curable composition prior to curing. The resulting cured resin, particularly a cured resin molded into a lens shape, may be subjected to surface finishing, such as formation of a hard coating or an anti-reflection coating.

The resin for high-refraction lenses according to the present invention has a high refractive index ranging from about 1.57 to about 1.60 and improved non-brittleness, i.e., high impact resistance. Further, since monomers containing a halogen atom are not needed, the resin has a small specific gravity. Furthermore, the curable resin composition used in the present invention can be subjected to thermal polymerization and ultraviolet polymerization before curing to thereby shorten the requisite time of curing.

The present invention is now illustrated in greater detail by way of Examples, but it should be understood that the present invention is not deemed to be limited thereto. All the percents and parts are by weight unless otherwise indicated.

Physical properties of the resins obtained were determined as follows.

1) Appearance:
Observed with eyes.
2) Refractive Index:
Measured with an Abbé refractometer at 25° C.
3) Impact Resistance:
The FDA standard was followed. That is, a steel ball weighing 16.3 g (diameter: 15.9 mm) was vertically dropped from the height of 127 cm on a specimen (2.0 mm thick plate) at 25° C. Specimens suffering no breakage were rated "good", those suffering breakage were rated "bad".
4) Hardness:
Measured by pencil hardness test.

EXAMPLE 1

Eighty-five parts of p-bis($\beta$-methacryloyloxyethylthio)xylylene, 15 parts of pentaerythritol tetrakis($\beta$-thiopropionate), 0.05 part of benzophenone, and 0.3 part of t-butyl peroxy-2-ethylhexanoate ("PERBUTYL O" produced by Nippon Oils & Fats Co., Ltd.) were uniformly mixed under heating at 40° C. with stirring. After degassing, the mixture was injected into a spacer having a diameter of 40 mm and a gap of 2 mm made of glass plates and a silicone rubber and irradiated with light emitted from a high-pressure mercury lamp of 80 W/cm$^2$ placed 40 cm above one of the glass plates 6 times for 3 minutes for each irradiation. The resulting cured resin was removed from the spacer and then heated in an oven at 80° C. for 1 hour and then at 100° C. for 2 hours.

Physical properties of the resulting cured resin are shown in Table 1 below.

EXAMPLES 2 TO 12

A cured resin was obtained in the same manner as in Example 1, except for changing the resin composition as shown in Tables 1 and 2. Physical properties of the resulting cured resin are shown in Tables 1 and 2.

EXAMPLES 13 TO 20

A cured resin was obtained in the same manner as in Example 1, except for changing the resin composition as shown in Tables 2 and 3 and changing the time of the first irradiation from 3 minutes to 10 minutes. Physical properties of the resulting cured resin are shown in Tables 2 and 3.

COMPARATIVE EXAMPLE 1

A cured resin was obtained in the same manner as in Example 1, except for using 100 parts of p-bis($\beta$-methacryloyloxyethylthio)xylylene. Physical properties of the resulting cured resin are shown in Table 3.

COMPARATIVE EXAMPLE 2

A cured resin was obtained in the same manner as in Example 1, except for using 50 parts of p-bis($\beta$-methacryloyloxyethylthio)xylylene and 50 parts of pentaerythritol tetrakis($\beta$-thiopropionate).

The resulting cured resin was too soft for use as a lens.

COMPARATIVE EXAMPLE 3

A cured resin was obtained in the same manner as in Example 1, except for using 50 parts of p-bis(β-methacryloyloxyethylthio)xylylene and 50 parts of tris[2-(β-thiopropionyloxy)ethyl] triisocyanurate.

The resulting cured resin was too soft for use as a lens.

TABLE 1

| Example No. | Resin Composition (part) | | | | | | | | Appearance | Refractive Index | Impact Resistance | Hardness | Specific Gravity |
|---|---|---|---|---|---|---|---|---|---|---|---|---|---|
| | A | B | C | D | E | F | G | H | | | | | |
| 1 | 85 | 15 | | | | | 0.05 | 0.3 | colorless and transparent | 1.589 | good | >H | 1.25 |
| 2 | 95 | 5 | | | | | 0.05 | 0.3 | colorless and transparent | 1.592 | good | >H | 1.24 |
| 3 | 85 | | 15 | | | | 0.05 | 0.3 | colorless and transparent | 1.589 | good | >H | 1.25 |
| 4 | 85 | | | 15 | | | 0.05 | 0.3 | colorless and transparent | 1.590 | good | >H | 1.26 |
| 5 | 85 | | | | 15 | | 0.05 | 0.3 | colorless and transparent | 1.589 | good | >H | 1.26 |
| 6 | 95 | | | | 5 | | 0.05 | 0.3 | colorless and transparent | 1.593 | good | >H | 1.25 |
| 7 | 85 | | | | | 15 | 0.05 | 0.3 | colorless and transparent | 1.589 | good | >H | 1.27 |
| 8 | 90 | | | | | 10 | 0.05 | 0.3 | colorless and transparent | 1.591 | good | >H | 1.26 |
| 9 | 95 | | | | | 5 | 0.05 | 0.3 | colorless and transparent | 1.592 | good | >H | 1.25 |

Note:
A: p-Bis(β-methacryloyloxyethylthio)xylylene
B: Pentaerythritol tetrakis(β-thiopropionate)
C: Trimethylolpropane tris(β-thiopropionate)
D: Trimethylolpropane tris(thioglycolate)
E: Dipentaerythritol hexakis(thioglycolate)
F: Tris[2-(β-thiopropionyloxy)ethyl]triisocyanurate
G: Benzophenone
H: t-Butyl peroxy-2-ethylhexanoate

TABLE 2

| Example No. | Resin Composition (part) | | | | | | | Appearance | Refractive Index | Impact Resistance | Hardness | Specific Gravity |
|---|---|---|---|---|---|---|---|---|---|---|---|---|
| | A | B | F | I | J | K | G | H | | | | |
| 10 | 77 | 14 | | 9 | | | 0.05 | 0.3 | colorless and transparent | 1.589 | good | >H | 1.26 |
| 11 | 85 | | 15 | 10 | | | 0.05 | 0.3 | colorless and transparent | 1.589 | good | >H | 1.26 |
| 12 | 85 | | 15 | | 5 | | 0.05 | 0.3 | colorless and transparent | 1.586 | good | >H | 1.26 |
| 13 | 85 | | 15 | | 10 | | 0.05 | 0.3 | colorless and transparent | 1.582 | good | >H | 1.27 |
| 14 | 75 | 10 | | | 15 | | 0.05 | 0.3 | colorless and transparent | 1.591 | good | >H | 1.23 |
| 15 | 75 | 10 | | | | 15 | 0.05 | 0.3 | colorless and transparent | 1.591 | good | >H | 1.24 |
| 16 | 76 | 6 | | | | 18 | 0.05 | 0.3 | colorless and transparent | 1.592 | good | >H | 1.23 |
| 17 | 71 | 9 | 15 | | 5 | | 0.05 | 0.3 | colorless and transparent | 1.591 | good | >H | 1.26 |
| 18 | 80 | 5 | | | | 15 | 0.05 | 0.3 | colorless and transparent | 1.596 | good | >H | 1.25 |

TABLE 2-continued

| Example No. | Resin Composition (part) | | | | | | | | Appearance | Refractive Index | Impact Resistance | Hardness | Specific Gravity |
|---|---|---|---|---|---|---|---|---|---|---|---|---|---|
| | A | B | F | I | J | K | G | H | | | | | |
| | | | | | | | | | transparent | | | | |

Note:
A: p-Bis($\beta$-methacryloyloxyethylthio)xylylene
B: Pentaerythritol tetrakis($\beta$-thiopropionate)
F: Tris[2-($\beta$-thiopropionyloxy)ethyl]triisocyanurate
I: 2,2-Bis[4-($\beta$-methacryloyloxyethoxy)phenyl]propane
J: Triethylene glycol dimethacrylate
K: Trimethylolpropane triacrylate
G: Benzophenone
H: t-Butyl peroxy-2-ethylhexanoate

TABLE 3

| Example No. | Resin Composition (part) | | | | | | | | Appearance | Refractive Index | Impact Resistance | Hardness | Specific Gravity |
|---|---|---|---|---|---|---|---|---|---|---|---|---|---|
| | A | B | F | M | N | L | G | H | | | | | |
| 19 | 71 | 9 | 15 | | | 5 | 0.05 | 0.3 | colorless and transparent | 1.594 | good | >H | 1.26 |
| 20 | 75 | 10 | | 15 | | | 0.05 | 0.3 | colorless and transparent | 1.594 | good | >H | 1.26 |
| Compar. Ex. 1 | 100 | | | | | | 0.05 | 0.3 | colorless and transparent | 1.593 | bad | >H | 1.24 |
| Compar. Ex. 2 | 50 | 50 | | | | | 0.05 | 0.3 | Unmeasurable due to a failure of obtaining a sufficiently cured resin. | | | | |
| Compar. Ex. 3 | 50 | | | 50 | | | 0.05 | 0.3 | Unmeasurable due to a failure of obtaining a sufficiently cured resin. | | | | |

Note:
A: p-Bis($\beta$-methacryloyloxyethylthio)xylylene
B: Pentaerythritol tetrakis($\beta$-thiopropionate)
F: Tris[2-($\beta$-thiopropionyloxy)ethyl]triisocyanurate
L: Styrene
M: 2,2-Bis[4-($\beta$-methacryloyloxyethoxy)-2,3,5,6-tetrabromophenyl]propane
N: Chlorostyrene
G: Benzophenone
H: t-Butyl peroxy-2-ethylhexanoate While the invention has been described in detail and with reference to specific examples thereof, it will be apparent to one skilled in the art that various changes and modifications can be made therein without departing from the spirit and scope thereof.

What is claimed is:

1. A cured resin for high-refraction lenses which is obtained by polymerizing a composition comprising
   (A) from 70 to 99 parts by weight of a sulfur-containing aromatic (meth)acrylate represented by formula (I'):

$$CH_2=C(R^1)-C(=O)-O-R^4-S-R^5-\text{[Ar}(Z)_q\text{]}-R^5-S-R^4-O-C(=O)-C(R^1)=CH_2$$

wherein $R^1$ represents a hydrogen atom or a methyl group; $R^4$ and $R^5$ each represents a divalent hydrocarbon group having from 1 to 4 carbon atoms; Z represents a halogen atom exclusive of a fluorine atom; and q represents 0 or an integer of from 1 to 4, (B) from 1 to 30 parts by weight of at least one mercapto compound selected from
   (B-1) a compound represented by formula (II):

$$(HSR^6C(=O)-O)_r R^7 \quad (II)$$

wherein $R^6$ represents a methylene group or an ethylene group; $R^7$ represents a hydrocarbon group having from 2 to 15 carbon atoms or an alkyl ether residue having from 2 to 15 carbon atoms; and r represents an integer of from 2 to 6; or
   (B-2) a compound represented by formula (III):

$$\text{(III)}$$

[isocyanurate ring structure with substituents W, O=C, N]

wherein W represents $$HS-(CH_2)_s-C(=O)-(CH_2CH_2O)_t-(CH_2)_u,$$

wherein s and u each represents an integer of from 1 to 8, and t represents 0 or an integer of 1 or 2; and
   (C) up to 50 parts by weight of an ethylenically unsaturated monomer copolymerizable with the compound represented by formula (I').

2. A cured resin for high-refraction lenses as claimed in claim 1, wherein said compound (B-2) is selected from the group consisting of tris[2-($\beta$-thiopropionyloxy)-ethyl] triisocyanurate, tris(2-thioglyconyloxyethyl) isocyanurate, tris[2-($\beta$-thiopropionyloxyethoxy)ethyl]

triisocyanurate, tris(2-thioglyconyloxyethoxyethyl) triisocyanurate, tris[3-(β-thiopropionyloxy)propyl] triisocyanurate, and tris(3-thioglyconyloxypropyl) triisocyanurate.

3. A cured resin for high-refraction lenses as claimed in claim 1, wherein said mercapto compound is the compound of formula (II), and said compound of formula (II) is selected from the group consisting of pentaerythritol tetrakis(β-thiopropionate), pentaerythritol tetrakis(thioglycolate), trimethylolpropane tris(β-thiopropionate), trimethylolpropane tris(thioglycolate), diethylene glycol bis(β-thiopropionate), diethylene glycol bis(thioglycolate), triethylene glycol bis(β-thiopropionate), triethylene glycol bis(thioglycolate), dipentaerythritol hexakis(β-thiopropionate) and dipentaerythritol hexakis(thioglycolate).

4. A cured resin for high-refraction lenses as claimed in claim 3, wherein said mercapto compound is the compound of formula (II), and said compound of formula (II) is pentaerythritol tetrakis(β-thiopropionate).

5. A cured resin for high-refraction lenses as claimed in claim 1, wherein said sulfur-containing aromatic (meth)acrylate is present in an amount of from 80 to 98 parts by weight.

6. A cured resin for high-refraction lenses as claimed in claim 1, wherein said mercapto compound is present in an amount of from 2 to 20 parts by weight.

7. A cured resin for high-refraction lenses as claimed in claim 3, wherein said sulfur-containing aromatic (meth)acrylate is present in an amount of from 80 to 98 parts by weight.

8. A cured resin for high-refraction lenses as claimed in claim 3, wherein said mercapto compound is present in an amount of from 2 to 20 parts by weight.

9. A cured resin for high-refraction lenses as claimed in claim 1, wherein said compound represented by formula (I') is p-bis[β-(meth)acryloyloxyethylthio]xylylene or m-bis[β-(meth)acryloyloxyethylthio]xylylene.

* * * * *